UNITED STATES PATENT OFFICE.

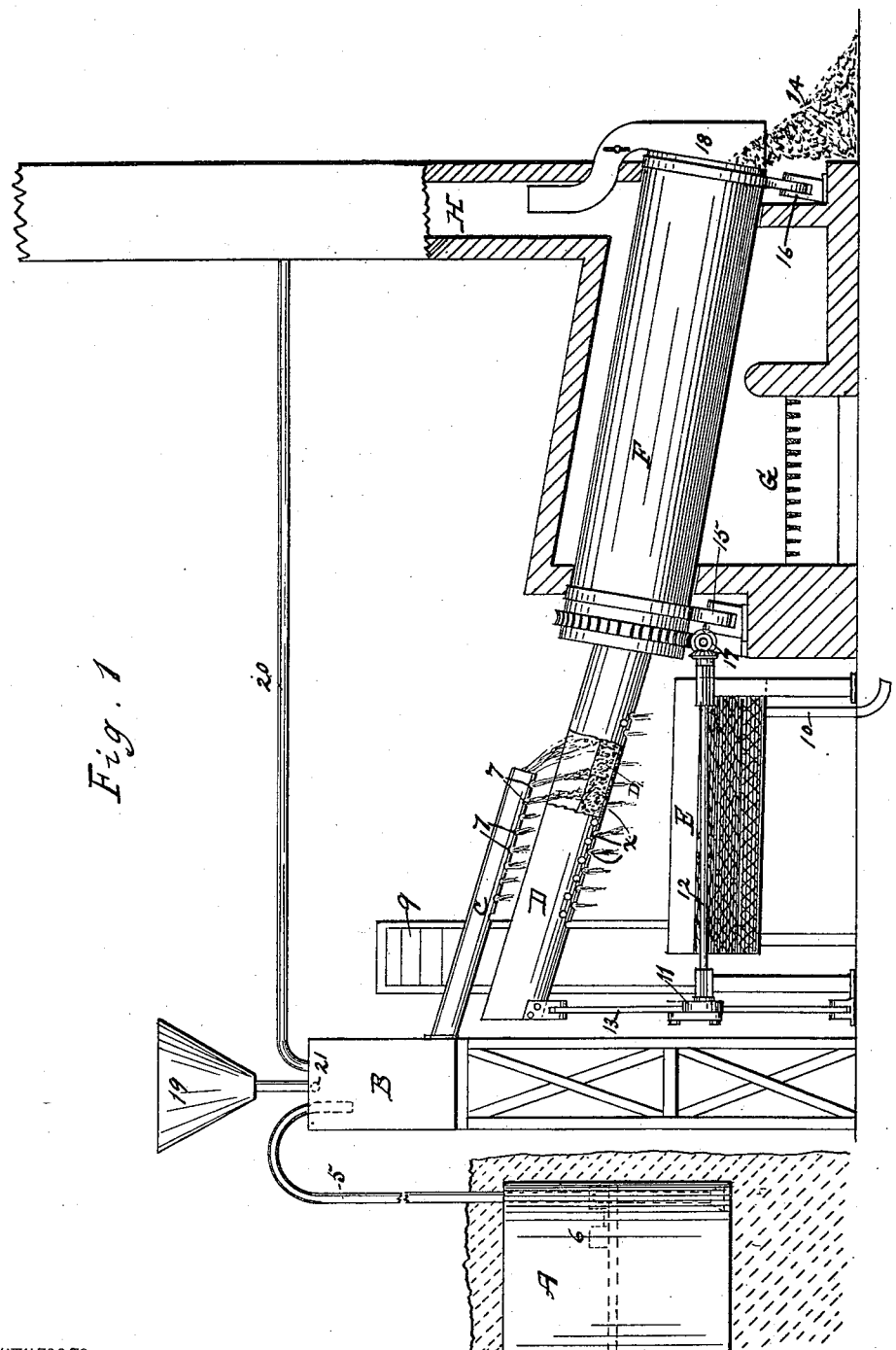

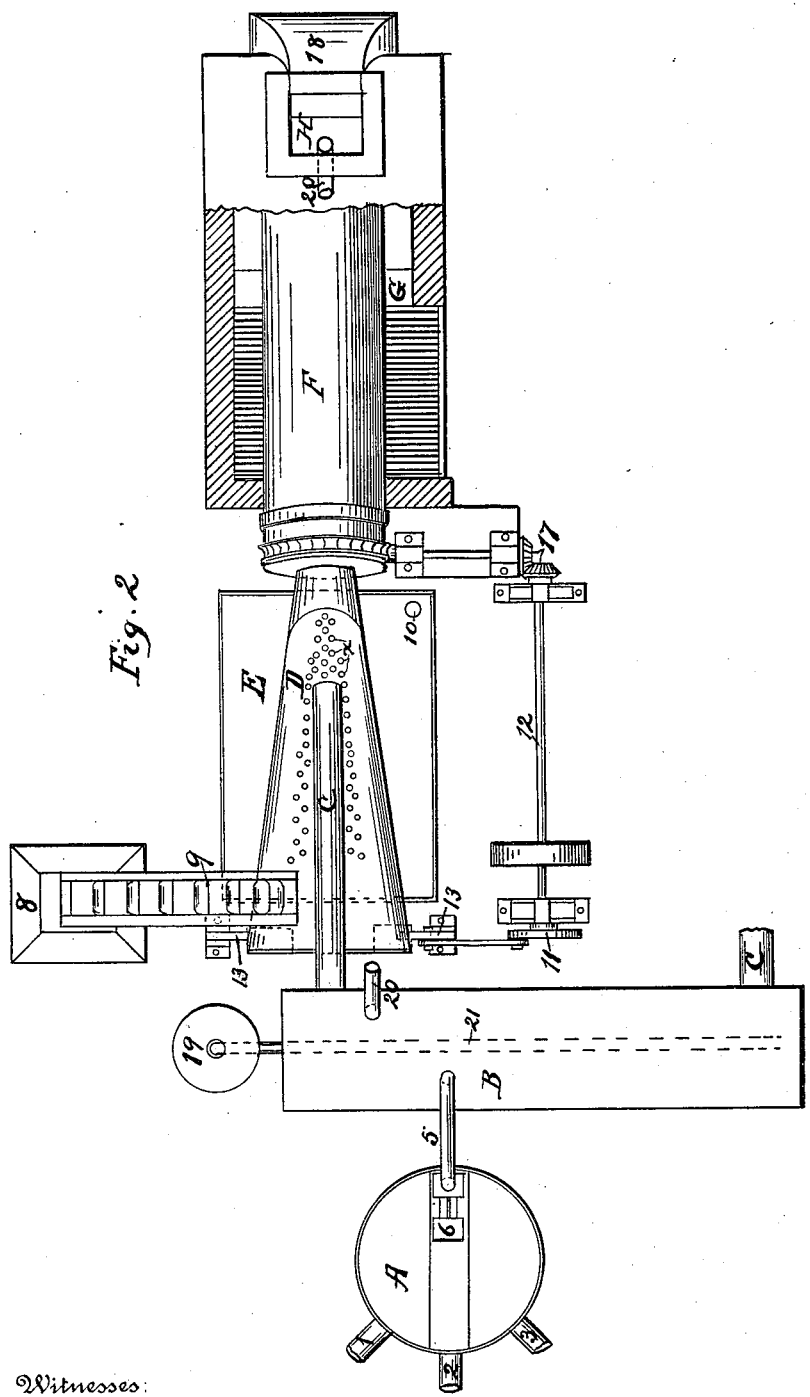

ROBERT J. G. WOOD, OF LEONIA, NEW JERSEY.

APPARATUS FOR TREATING SEWAGE.

SPECIFICATION forming part of Letters Patent No. 659,503, dated October 9, 1900.

Application filed April 11, 1899. Serial No. 712,567. (No model.)

*To all whom it may concern:*

Be it known that I, ROBERT J. G. WOOD, a citizen of the United States, and a resident of Leonia, in the county of Bergen and State of New Jersey, have invented certain new and useful Improvements in Sewage Treating and Utilizing Apparatus, of which the following is a specification.

My invention relates to treating sewage matter; and the object is to provide an apparatus for accomplishing this result which will deodorize and purify in a more simple, quick, and effective manner.

My invention consists of a receiving-tank, a reservoir, an oscillating hopper, a stationary filter-bed, a revolving drying-cylinder, and certain mechanical means for imparting motion to said hopper and cylinder and for preventing offensive odors while handling the material.

In order to more fully describe my invention, I refer to the accompanying drawings, forming a part of this specification, of which—

Figure 1 represents a side elevation of my apparatus, partly in section. Fig. 2 represents a plan view of the same.

Similar characters refer to similar parts in both views.

A is the receiving-tank into which the sewage of a village or town is collected, flowing into same through pipes 1 2 3. From this tank the material is forced up into the elevated reservoir B through pipe 5 by the pumps 6, the material being discharged from the said reservoir through the pipe C, which is perforated on the lower side at 7 7 to allow the water and greater portion of the material to escape, while the large and coarser articles will pass out of the end of the pipe. Below the said pipe C is located the vibrating and oscillating hopper D, which forms a filter-bed holder for all the sewage matter deposited by the discharge-pipe. In the bottom of this hopper is a layer of absorbent material D⁶—such as meadow-muck, marl, peat, sawdust, or any other desired material. The said material is raised from the receiving-hopper 8 by the bucket elevator 9 or any other suitable device. The bottom of the hopper D is also perforated at $x$ to allow the liquid to escape after having passed through the absorbent material in the hopper, which removes all solid material from it and falls on the stationary filter-bed E, where it is again filtered and flows out the waste-pipe 10 clear water, with all impurities removed. The absorbent material in hopper D having taken all the soil and filth from the water is caused to move down the hopper D into the drying-cylinder F by the incline of the hopper and the vibrating and oscillating motion imparted to same by the crank 11, attached to the driving-shaft 12 and connected to the rocking arms 13 13, which support one end of the said hopper, the other end of said hopper entering the drying-cylinder F, into which the material flows and is thoroughly dried and granulated by the revolving of the said cylinder, which is heated by the furnace G, and flows out of the end of cylinder ready for use as a fertilizer at 14. The cylinder F is mounted on supporting-wheels 15 and 16 and revolved by the worm and gear 17, attached to shaft 12. Over the discharge end of cylinder F is a bent hood 18, which connects to the smoke-flue of chimney H, which carries off all steam or vapor arising from the drying of the said material and to prevent offensive odor while handling the material I have a deodorizing-pipe 21, in the top of the reservoir B, which is perforated and connected to the holder 19, and I have also a vent-pipe 20, connecting the top of the said reservoir B with the stack H. Thus, it will be seen, I can thoroughly separate the solid matter from the liquid, discharging the water free of all impurities, evaporating all moisture from the solid material, and discharging it at the end of the operation ready for use as a fertilizer.

Having thus described my invention, what I claim, and desire to secure by Letters Patent, is—

1. In an apparatus for purifying and disposing of sewage, the combination with a discharge-pipe having perforations on the lower side, an elevated reservoir to which said pipe is connected, a receiving-tank connected by pipe to said reservoir, and means for forcing sewage from tank into reservoir, consisting of a pump, of an inclined vibrating oscillating hopper with open end and perforated bottom, said hopper placed below the discharge-pipe and adapted to contain an absorbent filtering material or substance, and means for vibrating and oscillating said hopper substantially as set forth.

2. In combination, the receiving-tank suitably connected with sewage-main, the elevated reservoir, connected by pipe with tank, the pump suitably located, for forcing the sewage from the tank into the reservoir, the discharge-pipe, connected to reservoir, and having perforations on lower side to allow the water or fluid and other material of sewage to escape, the inclined vibrating hopper placed below the discharge-pipe, and having open end and perforated bottom, said hopper adapted to contain a suitable absorbent filtering material or substance, and means for vibrating and oscillating said hopper, substantially as described.

3. In combination, the receiving-tank connected with sewage-main, the elevated reservoir connected with tank by pipe, the pump suitably located, for forcing the sewage into the reservoir, the discharge-pipe connected to reservoir, with perforations on lower side, the inclined vibrating oscillating hopper located below discharge-pipe and having perforated bottom adapted to contain an absorbent filtering substance, and an open end, and means for operating said hopper, and the stationary filter-bed located below the hopper, and having an outlet-pipe, substantially as set forth.

4. In an apparatus for treating and utilizing sewage, and in combination with the vibrating and oscillating hopper the revolving drying-cylinder mounted on supporting-wheels within, and over a suitable furnace, provided with a suitable chimney; and the bent hood suitably supported over the discharge end of drying-cylinder; and means for revolving said drying-cylinder, substantially as and for the purpose set forth.

5. In an apparatus for treating and utilizing sewage, the combination of the receiving-tank, the elevated reservoir, and means for forcing the sewage from tank to reservoir consisting of a pipe and a pump, the perforated outlet-pipe connected to the reservoir; the vibrating oscillating inclined open-end hopper and filter-bed holder, and means for vibrating and oscillating said hopper, the stationary filter-bed placed underneath hopper, and provided with outlet-pipe; the revolving drying-cylinder, supported on wheels within a furnace with chimney, and means for revolving said cylinder, the bent hood placed over the discharge end of said cylinder for the purpose set forth; the perforated deodorizing-pipe in the top of reservoir, and connected to the holder; and the vent-pipe connecting the top of said elevated reservoir with the chimney, all arranged to produce the object set forth.

Signed at New York, in the county of New York and State of New York, this 10th day of April, A. D. 1899.

ROBERT J. G. WOOD.

Witnesses:
ROBERT H. BOHM,
BENJ. A. DARE.